(12) United States Patent
Breuer

(10) Patent No.: US 11,457,401 B2
(45) Date of Patent: Sep. 27, 2022

(54) METHOD FOR TRANSMISSION OF SYSTEM INFORMATION IN A CELLULAR NETWORK

(71) Applicant: THALES DIS AIS Deutschland GmbH, Munich (DE)

(72) Inventor: Volker Breuer, Boetzow (DE)

(73) Assignee: THALES DIS AIS Deutschland GMBH, Munich (DE)

( * ) Notice: Subject to any disclaimer, the term of this patent is extended or adjusted under 35 U.S.C. 154(b) by 0 days.

(21) Appl. No.: 16/770,253

(22) PCT Filed: Nov. 21, 2018

(86) PCT No.: PCT/EP2018/082116
§ 371 (c)(1),
(2) Date: Jun. 5, 2020

(87) PCT Pub. No.: WO2019/120845
PCT Pub. Date: Jun. 27, 2019

(65) Prior Publication Data
US 2020/0389838 A1    Dec. 10, 2020

(30) Foreign Application Priority Data

Dec. 20, 2017 (EP) .................... 17208789

(51) Int. Cl.
*H04W 48/14* (2009.01)
*H04L 5/00* (2006.01)
*H04W 48/12* (2009.01)

(52) U.S. Cl.
CPC .......... *H04W 48/14* (2013.01); *H04L 5/0048* (2013.01); *H04W 48/12* (2013.01)

(58) Field of Classification Search
None
See application file for complete search history.

(56) References Cited

U.S. PATENT DOCUMENTS

2016/0234735 A1* 8/2016 Kubota .................. H04W 48/14
2017/0251500 A1* 8/2017 Agiwal ............. H04W 72/0413
(Continued)

OTHER PUBLICATIONS

International Search Report (PCT/ISA/210) dated Jan. 29, 2019, by the European Patent Office as the International Searching Authority for International Application No. PCT/EP2018/082116.
(Continued)

*Primary Examiner* — Hong S Cho
(74) *Attorney, Agent, or Firm* — Marc Boillot; Thales DIS CPL USA, Inc

(57) ABSTRACT

A method for transmitting system information items from a base station of a cellular network to first and second user equipment. The first user equipment is a first type of user equipment and the second user equipment is a second type of user equipment, different from the first type. Upon reception of a request for system information from the first and second user equipment, the base station collects a subset of the system information items considering the type of user equipment in a set of system information messages for the respective type of user equipment, and provides each of said set of system information messages to the requesting user equipment. At least one system information item is collected in the set of system information messages for the first type of user equipment, and is lacking in the set of system information messages for the second type of user equipment.

13 Claims, 4 Drawing Sheets

(56) References Cited

U.S. PATENT DOCUMENTS

2017/0311285 A1* 10/2017 Ly ..................... H04W 74/0833
2017/0325157 A1* 11/2017 Ly ......................... H04W 48/14
2019/0268830 A1*  8/2019 Kim .................. H04W 36/0072

OTHER PUBLICATIONS

Written Opinion (PCT/ISA/237) dated Jan. 29, 2019, by the European Patent Office as the International Searching Authority for International Application No. PCT/EP2018/082116.
Samsung, "System Information Signalling Design in NR", 3GPP TSG-RAN WG2 Meeting #94, R2-163371, System Information Signaling Design in NR, 3rd Generation Partnership Project (3GPP), vol. RAN WG2, No. Nanjing, China, May 22, 2016, XP051104902 (7 pages).

\* cited by examiner

***SystemInformationBlockType6* information element**

```
-- ASN1START

SystemInformationBlockType6 ::=       SEQUENCE {
    carrierFreqListUTRA-FDD    CarrierFreqListUTRA-FDD   OPTIONAL,    -- Need OR
    carrierFreqListUTRA-TDD    CarrierFreqListUTRA-TDD   OPTIONAL,    -- Need OR
    t-ReselectionUTRA          T-Reselection,
    t-ReselectionUTRA-SF       SpeedStateScaleFactors    OPTIONAL,    -- Need OP
    ...,
    lateNonCriticalExtension   OCTET STRING
(CONTAINING SystemInformationBlockType6-v8h0-IEs) OPTIONAL,
    [[ carrierFreqListUTRA-FDD-v1250 SEQUENCE (SIZE (1..maxUTRA-FDD-Carrier)) OF
            CarrierFreqInfoUTRA-FDD-v1250        OPTIONAL,   -- Cond UTRA-FDD
       carrierFreqListUTRA-TDD-v1250 SEQUENCE (SIZE (1..maxUTRA-TDD-Carrier)) OF
            CarrierFreqInfoUTRA-v1250            OPTIONAL,   -- Cond UTRA-TDD
       carrierFreqListUTRA-FDD-Ext-r12
            CarrierFreqListUTRA-FDD-Ext-r12 OPTIONAL,        -- Cond UTRA-FDD
       carrierFreqListUTRA-TDD-Ext-r12
            CarrierFreqListUTRA-TDD-Ext-r12 OPTIONAL         -- Cond UTRA-TDD
    ]]
}
```

Fig. 2 - Prior art -

METHOD FOR TRANSMISSION OF SYSTEM INFORMATION IN A CELLULAR NETWORK

FIELD OF THE INVENTION

The present invention relates to a method for transmission of system information between a base station of a cellular network and a user equipment. The invention also pertains to a base station using said method. The invention further relates to a method for a user equipment receiving said system information.

BACKGROUND OF THE INVENTION

In the field of cellular communication the provision of system information from the cellular network to the user equipments supposed to operate with the base stations of the cellular networks is a long established exercise since the days of GSM. Nonetheless with the evolvement of technologies through the technology standards from GSM (2G), over UMTS (3G), LTE (4G) to New Radio (5G), also the requirements for an effective system information provision has grown.

While for the established standards a broadcast of system information is carried out, for 5G it was already decided during the standardization proceedings that both a broadcast and on demand, in particular multicast signaling of system information is allowed. Multicast means in particular that the system information are provided on demand to one or more user equipments camping on a base station.

With this approach a couple of questions need to be solved that were not apparent in the legacy standards. This holds in particular true for the consideration of multiple different user equipment types, besides mobile handsets, e.g. machine-type communication (MTC) devices, like in cars, meter, vending machines, point-of-sale devices etc.

Even though when for each or at least some types of user equipments different sets of system information for multicast provisions are defined, it is likely that a user equipment will get various system information fields in vain.

This is due to the fact, that system information items (SI) are bundled in system information messages, considering that they fit in size and have the same priority resp. repetition frequency (periodicity). Each SI is part of one system information message.

This issue becomes more severe when in course of the ongoing standardization of the technology standard—in particular on topics relating to non-handset devices—the set of system information items will be subject of changes, while indeed legacy releases need to be supported as well. This approach is prone to become complicated when the periodicity needs of single system information items change.

However, to send an user equipment individual list of required system information, as would be the straightforward approach, is not promising in terms of signalling overhead, given the periodicity differences between system information.

It is therefore the goal of present invention to overcome the mentioned disadvantages and to propose a solution for an improved provision of system information by a base station of a cellular network to user equipments in the context of multicast system information provision.

Further alternative and advantageous solutions would, accordingly, be desirable in the art.

SUMMARY OF THE INVENTION

For this it is according to a first aspect of the invention suggested a method to operate for transmitting system information from a base station according to claim 1. It is further suggested according to a second aspect of the invention a base station according to claim 10. According to a third aspect of the invention it is proposed a method for a user equipment according to claim 15.

According to the first aspect of the invention it is proposed a method for transmitting system information items from a base station of a cellular network to a first user equipment and a second user equipment, the base station providing a plurality of system information items, and the first user equipment belongs to a first type of user equipment and the second user equipment belongs to a second type of user equipment, different from the first type, upon reception of a request for system information from the first and second user equipment, the method comprising the steps for the base station of:

collecting for each request a subset of the system information items considering the type of user equipment in a set of system information messages for the respective type of user equipment, and providing each of said set of system information messages to the requesting user equipment, wherein at least one system information item is collected in the set of system information messages for the first type of user equipment and said at least one system information item is lacking in the set of system information messages for the second type of user equipment.

The inventive method relates to a base station of a cellular network for wirelessly communicating with user equipments configured for operating in the cellular network, according to the known wireless technology standards, like 4G or 5G. The base stations are in particular called eNodeB resp. gNodeB.

Such base stations are in particular configured to provide system information, which comprise such information for the user equipment that are useful for operating within the cellular network, in particular such system information that differ between base stations. Each singular system information field is called a system information item.

Examples for such system information items are a barring indication, indicating if no access is allowed with said base station or not. Another example relates to information relating to neighbor cells, carrier frequency information etc.

A system information item has a defined data type, like a Boolean value for barring, a string of a certain length and/or a integer number, or even structures composed of other structures, arrays of fixed or variable length, or some of the mentioned data type primitives.

In legacy technology standards such information were broadcasted to all user equipments operating in proximity to the base station. The broadcast transmission can even be retrieved by a user equipment when not camping on the respective base station, it is moreover even useful before carrying out a cell reselection or registration to retrieve the system information of the envisaged base station.

In a new development such system information are foreseen to be provided on demand. According to the inventive method the retrieval of on demand system information is carried out by a request from a user equipment.

Preferably each user equipment interested in the system information sends a request to the base station. For sending such request it is preferable to camp on the base station.

Such requests may arrive at the base station either in parallel or with some time delay. Each request is preferably handled independently and without considering other requests from different user equipment supporting different user equipment types.

However requests from user equipments of the same type of user equipment, arriving during the period where system information are valid are preferably handled together. By now such a period is indicated by incrementing the known systeminfoValueTag which is typically broadcasted in SIB1. The base station is preferably anyhow aware of such a change.

According to a preferred embodiment it is suggested that the base station is configured to provide a subset of system information items by means of a broadcast channel.

This means the on demand system information transmission is in particular carried out in addition to broadcasted system information. Hence, some system information items are in particular supposed to be provided via broadcast only, others on demand only, and a third group potentially both via broadcast and on demand.

Preferably it is foreseen to transmit the system information messages by means of so-called multicast channels, also known as "LTE-Broadcast", where the receiving user equipments share a channel, e.g. for streaming, but not each user equipment gets a separate channel, each channel being fed with identical data.

The inventive method further considers that user equipments might provide different user equipment types.

The type of the user equipment in particular relates to the device type, e.g. if it is a mobile handset or a machine type communication device, or more detailed, if it is a low cost device, e.g. only capable of supporting a sub-variant of the respective technology standard, like LTE-CAT-M, Cat-NB-IoT, or envisaged 5G variants.

Preferably user equipments of the same type of user equipment are retrieving within one multicast channel its system information messages.

There are various ways for the base station to ascertain the type of user equipment of the requesting user equipment. According to a preferred embodiment it is suggested that the user equipment type is made available for the base station through at least one of:

provided with the request of the user equipment,
on request toward the user equipment,
ascertained through a cellular network component.

The user equipment type according to this preferred embodiment is therefore provided synchronously or asynchronously with the request for system information to the base station. A combination of both options is further envisaged.

As the first option the user equipment indicates its type of user equipment with the request for on demand system information.

Alternatively the base station requests the information. This is either done by requesting the information directly from the user equipment, in particular for a user equipment which did not camp on the respective base station for a given time period. Alternatively the base station ascertains the user equipment type from other cellular network components, e.g. central component like the HSS, or other RAN components, like other base stations.

It is also foreseen that the base station requests the type of user equipment by the one or the other way, when the type of user equipment is not already known before, e.g. by a first request from the user equipment comprising the user equipment type.

The type of user equipment is typically provided in coded form, e.g. a predefined code for a couple of known types of user equipments. Preferably then only the code is provided with the request by the user equipment, resp. in response to a request from the base station.

The inventive method suggests for the base station that for each request for system information the relevant system information items are collected, preferably after receiving the request for system information.

This is preferably carried out for eligible user equipment only. Hence preferably an eligibility check is carried out first.

For each request the base station collects a subset of system information items of all system information items that are available at the base station.

For the collection the base station at least considers the type of user equipment. This means in particular that the base station maintains a profile for each type of user equipment, which system information items are to be delivered to a requesting user equipment of that type.

If other criteria are taken into consideration, this subset of system information items may be enhanced or reduced.

In an alternative or additional preferred embodiment it is suggested that the request for system information comprises a service indication and the step of collecting further considers the requested service.

According to the embodiment the collection of system information items additionally or alternatively concerns a certain service usage. E.g. when a user equipment indicates that it requests or is about to request a service like VoLTE, then with the request for system information on demand also requires such system information items that support the usage of VoLTE, e.g. coding schemes, voice codecs etc.

It is obvious that such a service is only requested by such types of user equipment that are capable of providing that type of service.

It is in particular suggested that the request for system information is part of a request for a service.

With that preferred workflow the user equipment is supposed not to split its requests, at the one hand for system information, in particular comprising the imminent service type, then retrieves the respective system information and afterwards launches a service request. Instead with one request the service could be requested, in response the base station provides—in particular in conjunction with other information, in particular service related ones (e.g. availability, delays etc.) the respective system information items, which comply with the user equipment type and the requested service.

After collecting the system information items the base station places them in a set of system information messages. This is at least one system information message, but more messages are possible. Preferably a system information message has a limited available space for gathering system information items. The more system information items are collected for a specific user equipment type, the more system information messages are created.

The respective sets of system information messages are consequently delivered to the respective requesting user equipment.

This inventive method increases the flexibility and provides only those system information that are really needed. Further it reduces the amount of transmitted data, and consequently the duration and power consumption for the receiving user equipment.

In the following, embodiments of the first aspect of the invention are described. Additional features elucidated in the context of different embodiments can be combined with each other to form further embodiments of the first aspect of present invention, as long as they are not explicitly described as forming mutually exclusive alternatives to each other.

According to another embodiment the user equipment type in particular considers alternatively or additionally the supported technology release.

Hence it is proposed that the suggested method further comprises the step of ascertaining a release indication relating to the technology release the user equipment is configured to provide, and the step of collecting considers said release indication.

This embodiment acknowledged the situation that through technology releases different system information items are added, modified or replaced. Nonetheless the base station has to support also legacy user equipments that were brought in the field way before the current technology release was implemented. This backward compatibility poses a lot of overhead for the system information provision, as the broadcasted system information blocks today are full of alternative system information items for different technology releases and/or technology variants.

This in particular means that a certain system information item may look differently for an elder technology release than one for today. A typical example is the carrier frequency list, that changes in size for newer releases, or reselection criteria which have been in 4G subsequentially increased with settings defining new S-criteria such as RSRQ or WB-RSRQ in newer versions for neighbor cell selection.

When considering the technology release during collection of the system information items, then those system information items matching to the supported technology release can be picked, while legacy system information items of older technology releases are omitted. This in particular helps reducing the size of transmitted system information messages.

The technology release in particular relates to subsystems, e.g. a release of a special service like VoLTE, or any other service. A user equipment supporting a certain technology release might still support an elder technology release of that very service. However if that set of system information items is supported by broadcast information the user equipment only needs either of the sets for operating said service correctly.

With a technology release indication covering such situation, the base station then has the information to collect the best matching system information for the requesting user equipment.

With this embodiment it is in particular achieved that in case of changes in the definition of system information items over technology releases the system information messages need not to grow in size. Instead the evolution of system information message size is homogenous. The increase in size is not so high as for broadcasted system information blocks as they are known in legacy systems. System information messages according to this embodiment con-sequentially only remarkably grow, when additional features are introduced—and are supported by the user equipment.

The supported technology release is in particular submitted by the user equipment together with the request for system information. Alternatively or additionally the supported technology release is provided earlier, e.g. with the registration. Alternatively the supported technology release is already known in the cellular network, preferably in a network component like the HSS.

According to another preferred embodiment it is suggested that the system information items are collected in at least one system information container comprising a plurality of system information items, the system information container being related to one out of a set of fixed sizes, and a system information message comprising at least one system information container, and wherein for the first and the second user equipment type the system information items stored in the at least one system information container differ. In the context of broadcasted system information system information item combinations are known. Here a numbered set of so-called system information blocks (SIBs) is defined in the standard, starting from SIB2 up to e.g. SIB13. Said SIBs can be defined and transmitted combined within one system information message. As part of the technology standard definition each system information field has a fixed place and requires a certain size in the system information blocks. This is however disadvantageous as the receiving user equipment needs to receive and decode plenty of system information it might never need, including release dependent versions of information elements within certain SIBs.

The system information containers in the presently addressed on demand system information provision correspond to the system information block, however not with a fixed set of system information items collected in one system information message.

Instead for the system information container it is foreseen for the first type of user equipment to collect the relevant system information items. Preferably no additional system information items are placed in the system information container. The same is happening for the second type of user equipment. The system information container comprises identifications which system information items are collected in said container, and indications from where to derive which size said system information items, in particular each individual system information item, cover in the system information container.

Preferably herein at least one system information item is lacking for the second set of system information messages for the second type of user equipment compared to the set of system information items collected for the first type of user equipment. This situation was by now not the case, the user equipment type specific system information provision allows user equipments of a certain type to save time and energy in handling such system information messages. The system information messages comprise at least one system information container. The size of system information containers determine the number of system information messages necessary for a certain type of user equipment. Usually the system information container comprise a fixed size. Preferably for the case of system information items with variable size it is additionally foreseen that the size following a given block size is predetermined, e.g. 2048 bytes, 4096 etc. Such block size typically corresponds to the transmission carrier. Possible empty areas are then filled up e.g. with empty fields.

Thus the system information containers relates to a size which fits to such block sizes, and is still sufficiently flexible.

According to another preferred embodiment it is foreseen that step of adapting the system information container content according to the radio conditions at the requesting user equipment, the radio conditions being determined by the requesting user equipment.

With this embodiment the system information provision is even more individualized. When it is figured out by the receiving user equipment that the radio conditions are below a predefined threshold, then this information is preferably indicated to the base station. The base station then has means to adapt the coding of the system information messages. This would possibly lead to a reduction of content per message, but increase the decoding reliability. Hence, based on such reception conditions the number of system information messages is amended.

This embodiment is in particular advantageous for user equipments placed in areas with bad coverage, like metering devices placed in the basement of a house. It assures that the system information are reliably read, which is moreover the case when only relevant system information items are transmitted. By now the user equipment had to read the broadcasted system information until they are fully understood, with the hope that the system information are not outdated already and need to be read again—even when the change in system information leading to the outdating are not relevant for the type of user equipment.

According to another preferred embodiment it is suggested that the method further comprises on request of the user equipment for a basic set of system information the step of collecting a subset of system information items in at least one system information message, the subset of system information items comprising less system information items than the subset of the system information items for the type of user equipment of the requesting user equipment.

This embodiment covers the situation that a user equipment might have issues to receive and/or decode the provided system information, in particular those provided on demand and/or those being broadcasted.

This is in particular the case in the situation of bad reception conditions. Alternatively issues with the decoding of well received system information messages are also envisaged as use case.

In that case the user equipment is expected to submit a request for a basic set of system information items. This is in particular a predefined subset of the available system information items, resp. the system information items predefined for the respective type of user equipment.

Preferably the basic set of system information items is composed of those system information items that are essentially needed for camping on the base station, resp. for registering on the base station with the then provided system information items.

By this embodiment it is in particular made possible to create a fallback position for giving access to a user equipment. This goal is achieved by another preconfigured subset of system information items as part of the provided on demand system information messages.

The respective user equipment making use of this embodiment is therefore preferably expected to receive broadcasted system information, and/or on demand system information. In case that the decoding fails, the user equipment would then send a special request for the minimum set of system information to the respective base station.

In response the respective base station acts according to this embodiment. Hence it allows the user equipment to operate with the base station. Further steps of solving the issues that lead to the failed decoding are envisaged to be carried out afterwards when the user equipment managed to camp on the base station.

The mentioned embodiments are in particular foreseen to be executed alone or in combination with at least one other embodiment of the inventive method.

According to a second aspect of the invention it is proposed a base station of a cellular network configured to transmit system information items to a first user equipment and a second user equipment, the base station is configured to provide a plurality of system information items, and the first user equipment belongs to a first type of user equipment and the second user equipment belongs to a second type of user equipment, different from the first type, upon reception of a request for system information from the first and second user equipment, the base station is configured to:

collect for each request a subset of the system information items considering the type of user equipment in a set of system information messages for the respective type of user equipment, and provide each of said set of system information message to the requesting user equipment, wherein at least one system information item is collected in the set of system information messages for the first type of user equipment and said at least one system information item is lacking in the set of system information messages for the second type of user equipment.

The base station is in particular equipped with transmitting and receiving circuitry for exchanging signals with user equipments over the air interface according to at least one cellular technology standard.

The base station further comprises processing circuitry, that means in particular at least one processor for executing software programs implementing methods as the inventive method and embodiments of the first aspect of the invention.

Further the base station is preferably equipped with communication means to other components of the cellular network it is part of. Such communication means are in particular wired connections. Such components of the cellular network, that are directly or indirectly reachable via said communication means comprise in particular a home subscriber server (HSS).

Preferably the base station provides volatile and/or permanent memory, at least for holding software programs and/or preconfigured information, e.g. relating to system information item configurations.

Principally, the second aspect of the invention shares the advantages of the first aspect of the invention. In particular the user equipment has preferred embodiments that correspond to embodiments of the method described above.

According to the third aspect of the invention it is proposed a method for a user equipment configured to operate with a base station of a cellular network, the base station is configured to provide a plurality of system information items, at least for a first type of user equipment and a second type of user equipment, different from the first type, said user equipment belonging to the first type of user equipment, the method comprising the step for the user equipment of:

sending a request for system information to the base station, receiving in response at least one system information message, said at least one system information message comprising a subset of the system information items considering the type of the user equipment, wherein at least one system information item contained in the set of system information messages for the first type of user equipment is lacking in the set of system information messages for the second type of user equipment.

The third aspect of the invention relates to a user equipment for communication according to one of the known wireless technology standards, like 4G, 5G or beyond. The user equipment is equipped with the necessary circuitry for communicating over the air interface with the base stations, resp. eNodeBs of the cellular network, in particular according to the second aspect of the invention. This comprises in particular transceiver circuitry, including receiving and transmitting capabilities. According to the circuitry also a separate structural design of transmitting circuitry and receiving circuitry is encompassed by the inventive user equipment. This in particular relates to a radio modem connected to an application device.

The user equipment resp. its transceiver is configured to receive and decode signals from base stations. The user equipment further maintains information relating to the type of user equipment it belongs to.

Principally, the third aspect of the invention shares the advantages of the first and second aspect of the invention. In particular the user equipment has preferred embodiments that correspond to embodiments of the method described above.

According to a preferred embodiment it is further suggested, that in case the user equipment fails to decode said at least one system information message provided by the base station, the step of requesting from the base station a basic version of system information items for camping on the base station. This embodiment relates to the situation for the user equipment that it receives system information, in particular via broadcast, then checks if it is able to receive said system information. If this should fail, out of decoding issues or an expected format failure etc., then the user equipment is not able to camp on that base station.

Hence if the user equipment might not be able to properly receive resp. decode system information transmissions, either by broadcast or by multicast resp. on demand delivery, then this advantageous embodiment shall allow the user equipment to fall back to a preconfigured minimum resp. basic set of system information items, different than the regular set of system information preconfigured for the type of system information the user equipment belongs to. The user equipment hence has means to inform the base station about this situation, and the base station will in response provide the respective system information message with said minimum set of system information items.

It is more likely that the user equipment is able to receive and decode the system information messages from the base station with the basic set of system information items. Hence this embodiment offers a fallback solution, should something went wrong with acquiring system information at the user equipment.

As it is shown this invention advantageously solves the depicted problem offers a solution for on demand system information delivery that is ready for future development and nevertheless already today renders advantageous means of system information retrieval, in particular for low cost user equipments with a small power budget over a long time.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 2 shows the definition of a system information block according to the prior art;

FIG. 1 schematically shows a base station BS of the type to which the present invention is applied as an embodiment. The base station is part of the cellular network CN, which comprises many more base stations (not shown), preferably with similar configuration than the shown base station.

The base station BS is configured to serve a plurality of user equipments UE1, UE2, or as a skilled person in the area of cellular communication puts it: the user equipments are camping on the base station.

In this example the shown user equipments UE1, UE2 represent two different types of user equipment. The first user equipment UE1 represents a common smartphone, designed for end customer use. Such smartphones are typically equipped to make voice calls, sets up data connections, watching streamed videos, being called, writing SMS and be moved around. Each of this activities is fully carried out in the discretion of the customer who uses the smartphone, that means in particular none of these activities is foreseeable, neither in terms of when it happens nor in terms of what time it takes and/or what amount of data are transmitted or which cellular network service is used.

The second user equipment UE2 however is a machine-type communication device (MTC), in this case in the form of a point-of-sale device (POS). Such a device has typically only one task: when a payment operation is supposed to be carried out, then it sets up a data connection to a payment server, submits information about the bank card entered into the POS device, awaits a confirmation from the server and closes the connection. Rarely but in regular intervals the user equipment UE2 may request for system updates, and downloads them when available.

In this embodiment the user equipment UE2 is fixed on a cash counter in a shop, or part of a vending machine, e.g. for train tickets.

The user equipment UE2 is however not configured for accepting or placing a voice call, also SMS transmission or retrieval is not supported. All communication is initiated by the user equipment as well, that means no inbound communication is expected.

The limitation of functionality makes it superfluous e.g. to page for incoming calls or SMS. It further does not require to carry out mobility management operations, at least not that frequently as a mobile handset. The only realistic way to make it necessary to change the cell would lie on the network side, e.g. a change in topology, that means activating or switching off of base stations, or that the current base station BS is congested.

Hence, from the amount of system information items that the base station would be able to provide the user equipment UE2 requires for properly operating far less than the user equipment UE1.

Figure 1:
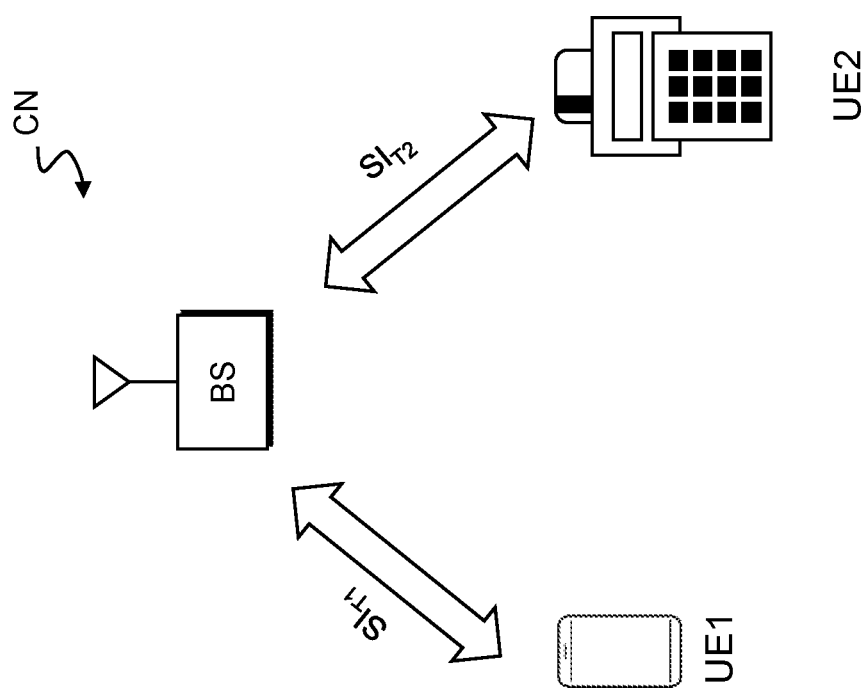
FIG. 1 represents a situation for a base station of the type to which the present invention is applied as an embodiment.

Therefore as indicated in FIG. 1 the system information are not resp. not only broadcasted as it is known from legacy technology standards, but for each type of user equipment a special selection of system information items is predetermined.

For user equipment UE1 belonging to the type of user equipment "Smartphone" preferably the system information messages $SI_{T1}$ are predetermined and consequently provided.

For user equipment UE2 belonging to the type of user equipment "stationary data transmission only", preferably the system information messages $SI_{T2}$ are predetermined and provided.

In both cases preferably the user equipment UE1, UE2 sends a request for system information, comprising an indication of the type of user equipment the user equipment belongs to, to the serving base station BS.

The system information messages $SI_{T2}$ for the latter type of user equipment preferably does not comprise system information items relating to paging of voice calls. However such system information items are available in the system information messages $SI_{T1}$.

Preferably some system information items designed for user equipments of the user equipment type of user equipment UE2 are not available for the "Smartphone" type user equipments. Preferably such system information items relate to power saving capabilities, or alternative times for mobility related functions.

Additionally both user equipments may support different technology releases. Hence the request for system information to the base station BS additionally or alternatively comprises a release indication.

As system information items may change over releases, e.g. due to the fact that more data need to be covered (e.g. the number of supported bands increased immensely from 2G to 4G), each system information item per release is to be understood as a separate system information item. This leads to the situation that even for two user equipments belonging to the same basic type of user equipment, different system information items are required for properly operating, when they support different technology releases.

In FIG. 2 it is shown a part of the definition of system information block 6 as defined in current LTE release 12. In this definition it is visible that basically only a list of carrier frequencies is supposed to be transmitted. But this definition makes many differentiations. First different carrier frequencies are foreseen for the technology variants FDD (frequency division duplex) and TDD (time division duplex) networks. Both variants of UMTS and LTE obviously require carrier frequency lists of different size. The type of user equipment is foreseen to cover this, that would mean a type of user equipment "TDD-Smartphone" and another type "FDD-Smartphone", and potentially also "TDD-FDD-Smartphone" would cope with that distinction.

Additionally it is visible that for different technology releases different system information items, respectively data types of system information items are foreseen. The release number appears in the system information item name, like 'carrierFreqListUTRA-FDD-v1250'. Consequently such system information items would only be provided for user equipments providing as release indication a release number of V12.5 or more.

Further in FIG. 2 it is visible, that in the legacy technologies all system information are bundled in system information blocks, here SIB6. For determining only one of the information comprised in system information block SIB6, the whole block needs to be received and decoded by the user equipment. If this is repeatedly done, this drains the battery of the user equipment.

Figure 3:
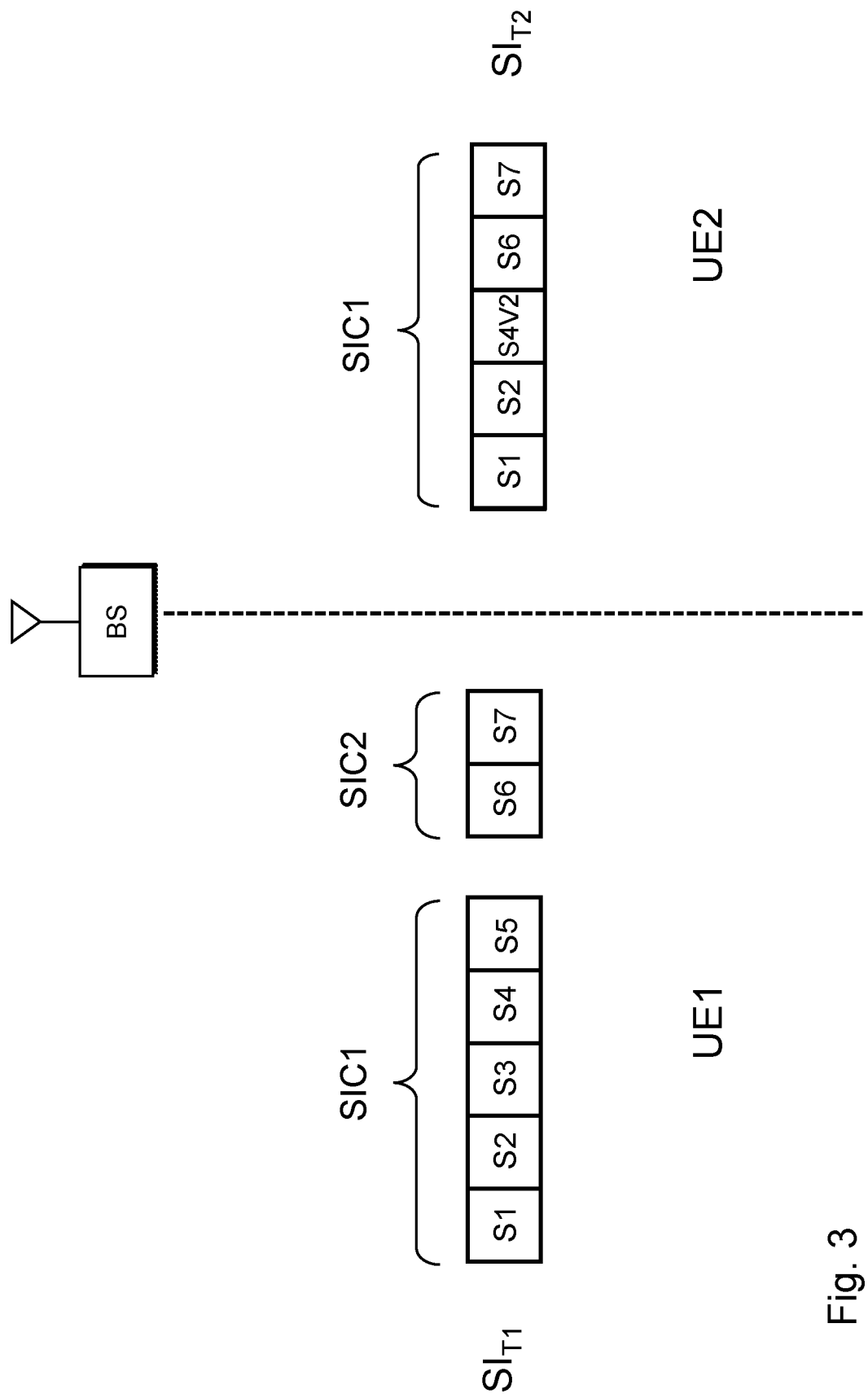
FIG. 3 represents an exemplary schematic collection of system information at a base station according to an exemplifying embodiment.

Therefore it is shown in FIG. 3 according to an exemplifying embodiment the collection of system information containers SIC1, SIC2 for the respective user equipments UE1 and UE2. Here it is shown a couple of system information items S1-S7, which are predetermined for the type of user equipment the user equipment UE1 belongs to. For the situation of FIG. 1, with user equipment UE1 being a smartphone, here the shown system information items represent the system information items a smartphone needs for properly operating with base station BS.

Further it is shown the two system information containers SIC1, SIC2, both forming the system information message $SI_{T1}$.

On the other side, for user equipment UE2, under the assumption this is the POS device shown in FIG. 1, the system information message $SI_{T1}$ does not require the two system information containers SIC1 and SIC2, but one container is sufficient. This is due to the size of the system information items reserved for this type of user equipment.

As it can be seen, system information container SIC1 lacks a couple of system information items compared to the system information container SIC1 collected for the system information message $SI_{T1}$.

The system information items S3, S4 and S5 are not available in the system information container. Instead the system information items S6 and S7—part of system information container SIC2 for the first user equipment UE1—are filling up system information container SIC1.

Additionally system information item S4 is replaced in this system information container for user equipment UE2 by system information item S4V2. This system information item S4V2 is introduced in a later technology release than system information item S4. User equipment UE2 indicated in its request for system information that it implements that later technology release. Therefore the base station when collecting the system information containers considers the supported technology release and consequently provides the respective system information item S4V2 for that release.

Figure 4:
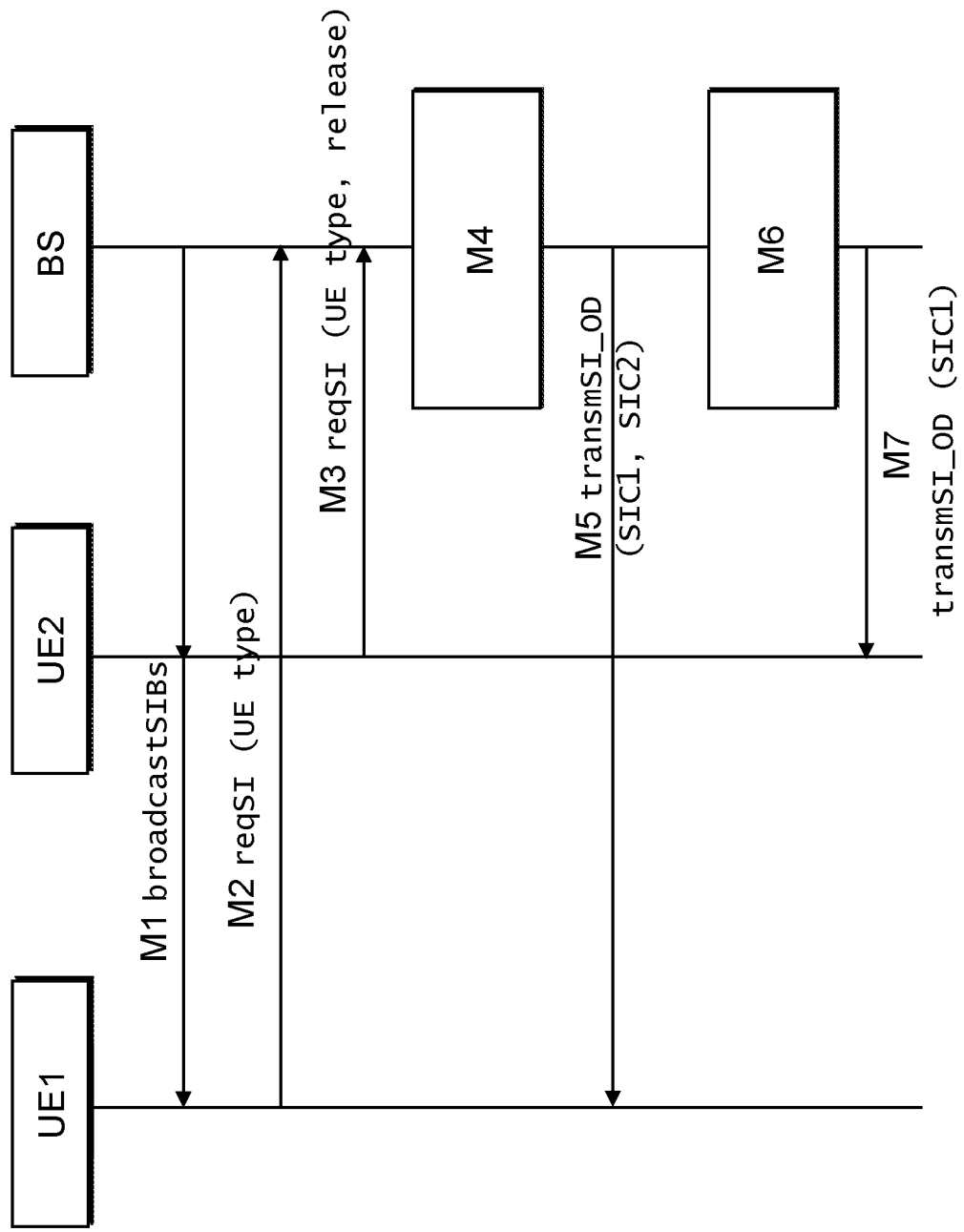
FIG. 4 shows a sequence diagram according to another preferred embodiment of the inventive method.

The general sequence flow for the two user equipments UE1, UE2 camping on base station BS is shown in FIG. 4.

The sequence flow starts with the user equipments broadcasting with message M1 its system information blocks (SIBs) to all camping user equipments, including UE1, UE2.

Preferably those SIBs are already receivable before camping on said base station. For the shown exemplifying embodiment it is however assumed that UE1, and UE2 are camping on base station BS.

After that, the two user equipments decide to request on demand system information, fitting for the type of user equipment they belong to. This is preferably driven by the broadcasted system information, as in a preferred embodiment the broadcasted system information comprise information about how, when, how often etc. on demand system information are expected to be requested by the user equipments.

Hence in response the both user equipments send with the messages M2 and M3 system information requests to the base station. Both can preferably happen in parallel or in another order. The requests comprise the type of user equipment the sending user equipment is belonging to.

User equipment UE2 preferably adds to the request message M3 the release indication, indicating which technology release the user equipment is supporting.

On the base station side the requests are consequently handled, in step M4 and M6. Here for each of the requesting user equipment the predetermined system information items are collected, considering the received type of user equipment, and—where available—the release indication. If no release indication is delivered, then preferably the request is understood to deliver system information items regardless of the release indication. The system information items are collected in system information containers SIC1, SIC2. Both system information containers are returned in message M5 to user equipment UE1.

As shown before in FIG. 3, for user equipment UE2 only one system information container SIC1 suffices. This system information container SIC1 is provided with message M7 to the requesting user equipment UE2.

The system information container SIC1 for user equipment UE1 consequently contains system information items that are not part of the system information container SIC2 submitted to user equipment UE2.

This exemplifying, and deliberately simplified, example makes clear that with the inventive concept the system information provision to different types of user equipment became more flexible and efficient. For the receiving user equipments with restrictions in terms of processing resources and power consumption this approach makes it more feasible to operate in the cellular network providing inventive base stations as suggested.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for transmitting system information items from a base station of a cellular network to a first user equipment and a second user equipment, the base station providing a plurality of system information items, and the first user equipment belongs to a first type of user equipment and the second user equipment belongs to a second type of user equipment, different from the first type,
   upon reception of a request for system information from the first and second user equipment, the method comprises the steps for the base station of:
      ascertaining a release indication relating to the technology release the user equipment is configured to provide,
      collecting for each request a subset of the system information items considering the type of user equipment in a set of system information messages for the respective type of user equipment, wherein the step of collecting considers said release indication, and
      providing each of said set of system information messages to the requesting user equipment,
   wherein at least one system information item is collected in the set of system information messages for the first type of user equipment and said at least one system information item is lacking in the set of system information messages for the second type of user equipment.

2. Method according to claim 1,
   wherein the type of user equipment is made available for the base station through at least one of:
      being provided with the request of the user equipment,
      on request toward the user equipment,
      ascertained through a cellular network component.

3. Method according to claim 1,
   wherein the base station is configured to provide a subset of system information items by means of a broadcast channel.

4. Method according to claim 1,
   wherein the request for system information comprises a service indication
   and the step of collecting further considers the requested service.

5. Method according to claim 4,
   wherein the request for system information is part of a request for a service.

6. Method according to claim 1,
   wherein the system information items are collected in at least one system information container comprising a plurality of system information items, the system information container being related to one out of a set of fixed sizes, and a system information message comprising at least one system information container,
   and wherein for the first and the second user equipment type the system information items stored in the at least one system information container differ.

7. Method according to claim 6,
   further comprising the step of adapting the system information container content according to the radio conditions at the requesting user equipment, the radio conditions being determined by the requesting user equipment.

8. Method according to claim 1,
   further comprising on request of the user equipment for a basic set of system information items the step of collecting a subset of system information items in at least one system information message, the subset of system information items comprising less system information items than the subset of the system information items for the type of user equipment of the requesting user equipment.

9. Base station of a cellular network configured to transmit system information items to a first user equipment and a second user equipment, the base station being configured to provide a plurality of system information items, and the first user equipment belongs to a first type of user equipment and the second user equipment belongs to a second type of user equipment, different from the first type,
   upon reception of a request for system information from the first and second user equipment, the base station is configured to:
      ascertain a release indication relating to the technology release the user equipment is configured to provide,
      collect for each request a subset of the system information items considering the type of user equipment in a set of system information messages for the respective type of user equipment, wherein collecting a subset of system information items the base station is further configured to consider said release indication, and
      provide each of said set of system information message to the requesting user equipment,
   wherein at least one system information item is collected in the set of system information messages for the first type of user equipment and said at least one system information item is lacking in the set of system information messages for the second type of user equipment.

10. Base station according to claim 9,
   wherein the request for system information comprises a service indication and or collecting a subset of system information items the base station is further configured to consider the requested service.

11. Base station according to claim 9, further configured to collect the system information items in at least one system information container comprising a plurality of system information items, the system information container having a fixed size, and a system information message comprising at least one system information container, and wherein for the first and the second user equipment type the system information items stored in the at least one system information container differ.

12. Base station according to claim 11, further configured to adapt the system information container content according to the radio conditions at the user equipments, the radio conditions being determined by the requesting user equipment.

13. Method for a user equipment configured to operate with a base station of a cellular network, the base station being configured to provide a plurality of system information items, at least for a first type of user equipment and a second type of user equipment, different from the first type, said user equipment belonging to the first type of user equipment, the method comprising the step for the user equipment of:
sending a request for system information to the base station,
receiving in response at least one system information message, said at least one system information message comprising a subset of the system information items considering the type of the user equipment,
wherein at least one system information item contained in the set of system information messages for the first type of user equipment is lacking in the set of system information messages for the second type of user equipment, and
further comprising, in case the user equipment fails to decode said at least one system information message provided by the base station, the step of requesting from the base station a basic version of system information items for camping on the base station.

* * * * *